April 11, 1950     A. BOUWERS     2,503,319
CAMERA WITH CATADIOPTRIC OPTICAL SYSTEM Filed Dec. 26, 1945

INVENTOR
ALBERT BOUWERS
BY
E. F. Wenderoth
ATTORNEY

Patented Apr. 11, 1950

2,503,319

UNITED STATES PATENT OFFICE 2,503,319

CAMERA WITH CATADIOPTRIC OPTICAL SYSTEM

Albert Bouwers, Delft, Netherlands, assignor to N. V. Optische Industrie "De Oude Delft"

Application December 26, 1945, Serial No. 637,188 In the Netherlands August 23, 1941

Section 1, Public Law 690, August 8, 1946 Patent expires August 23, 1961

4 Claims. (Cl. 95—11)

Cameras are known in which the objective is constituted by a centered optical system which consists of a spherical mirror to which is added a correcting element consisting of one or more lenses. Thus, for instance, it has already been proposed to equip a camera with a mirror lens whose errors are made up for by a correcting element consisting of two lenses having spherical surfaces. Another example of such a camera is Schmidt's camera in which use is made of a spherical mirror whose errors are corrected by a correcting element having at least one aspherical surface.

Although this kind of camera generally has the advantage of a high luminous intensity it might be deemed objectionable that they are comparatively cumbersome and consequently less adapted to be used instead of the usual cameras by amateurs.

The present invention provides an improvement of this kind of camera which permits these cameras to be given a much smaller size whilst retaining their excellent properties.

To this end the camera according to the invention exhibits the feature that the aperture of the stop and the parts of the objective are entirely or substantially entirely located at the same side of the axis of the system. Thus it is achieved that the size in a cross-section of the objective parts is much smaller than that of the cameras hitherto used, and as a result of the position of the aperture of the stop at the side of the axis of the system less shadow effects are experienced which might be caused by the image holder available in the camera.

It is to be noted that the said correcting element may be realised in various ways. Thus, for instance, it may exclusively be given spherical limiting surfaces with which may be combined a spherical collecting mirror, or, such as is the case in Schmidt's camera, the correcting element may be given an aspherical surface. In the last-mentioned case, also, the correcting element is a solid of revolution about the axis of the system.

In one form of construction of the invention it is structurally simple to provide circular objective parts which is also advantageous in conjunction with the manufacture of the objective parts.

The invention will be more fully explained by reference to the accompanying drawing.

Figure 1:
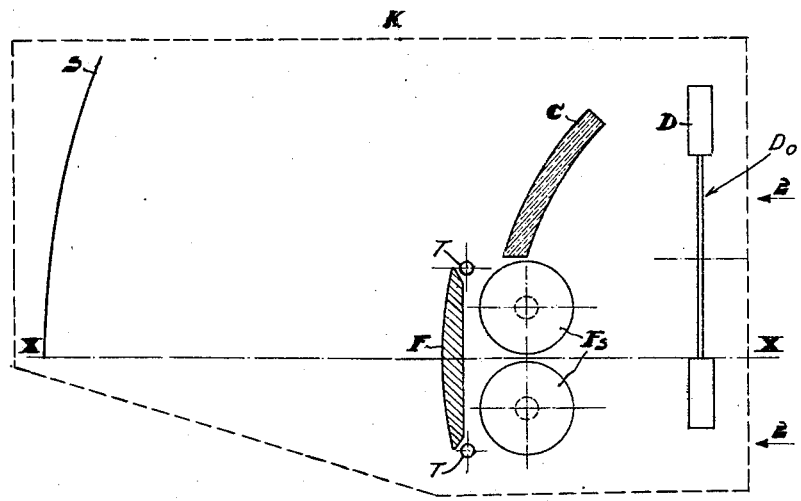
Figure 2:
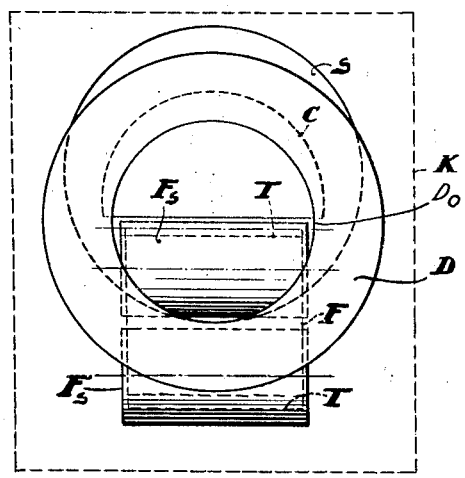

Fig. 1 is a longitudinal section of the essential parts of the camera according to the invention, Fig. 2 being an elevation of these parts in the direction of the arrows 2—2 of Fig. 1.

In these figures S represents the spherical mirror, C the correcting element, F the film carrier, T the conveying rollers for the film, Fs the film spools, D the stop and Do the aperture of the stop. In Fig. 1 the axis of the system is indicated by X—X.

From the drawing it appears that the spherical mirror S, the correcting element C (which exhibits spherical limiting surfaces in this construction) and the stop D are located at one side of the axis X—X of the system. This permits the cross-section of the camera to be kept small, which also appears from the polygons K indicated in dotted lines in Figures 1 and 2, which may represent the outlines of the housing containing the parts referred to. At the same time it is ensured that the shadow of the film carrier F falls substantially entirely beyond the active part of the mirror S.

For the sake of clearness the film, the shutter and the other parts of the camera have been omitted in Fig. 2.

The mirror S has a substantially circular boundary, that is, the periphery of the active reflecting portion is circular, as is apparent from a comparison of Figs. 1 and 2. Part of the light incident upon the face of the camera passes through the circular stop aperture Do. Most of this light then passes through the spherical-aberration correcting element C, which compensates for the spherical aberration introduced by the mirror C, and the light is then reflected by the latter to form the image at the image surface of the film carrier F, which may allow for the film thickness. Substantially all the light which does not pass through element C, strikes the film carrier and rolls, but shadow effects are reduced because of the position of the aperture Do relative to the mirror S.

What I claim is:

1. A camera having an optical axis and comprising a film carrier having an image surface substantially centered about said axis, a concave spherical mirror arranged asymmetrically with respect to said axis and having its image surface substantially coincident with said film carrier image surface, a camera stop having an aperture arranged asymmetrically about said optical axis and on the same side thereof as said spherical mirror, and a spherical-aberration correcting element having spherical refracting surfaces interposed between said stop and said mirror and positioned asymmetrically with respect to said optical axis and on the same side thereof as said mirror.

2. A camera having an optical axis and comprising a film carrier having an image surface substantially centered about said axis, a concave spherical mirror arranged asymmetrically with respect to said axis having its center of curvature on said axis and having its image surface substantially coincident with said film carrier image surface, a camera stop having an aperture arranged asymmetrically with respect to said optical axis and on the same side thereof as said optical mirror, and a spherical-aberration correcting element having spherical refracting surfaces interposed between said stop and said mirror and positioned asymmetrically with respect to said optical axis and on the same side thereof as said mirror.

3. A camera having an optical axis and comprising a film carrier having an image surface substantially centered about said axis, a concave spherical mirror arranged asymmetrically with respect to said axis having a substantially circular boundary and having its center of curvature substantially on said optical axis and having its image surface substantially coincident with said film carrier image surface, a camera stop having an aperture arranged asymmetrically about said optical axis on the same side thereof as said spherical mirror, said aperture having a plane positioned substantially perpendicular to said axis, and a semi-circular spherical-aberration correcting element interposed between said stop and said mirror and positioned asymmetrically with respect to said optical axis and on the same side thereof as said mirror, said correcting element having spherical refracting surfaces the centers of curvature of which lie substantially on said axis and having the lower flat edge thereof substantially coinciding with a plane through the center of said aperture and above said film carrier image surface.

4. A camera having an optical axis and comprising a film carrier having an image surface substantially centered about said axis, a concave spherical mirror arranged asymmetrically with respect to said axis and having its image surface substantially coincident with said film carrier image surface, a camera stop having an aperture arranged asymmetrically about said optical axis and on the same side thereof as said spherical mirror, and a spherical-aberration correcting element having spherical refracting surfaces interposed between said stop and said mirror and positioned asymmetrically with respect to said optical axis and on the same side thereof as said mirror, said correcting element being substantially semi-circular and having the flat portion thereof substantially coinciding with a plane through the center of said camera stop aperture.

ALBERT BOUWERS.

REFERENCES CITED

The following references are of record in the file of this patent:

UNITED STATES PATENTS

| Number | Name | Date |
|---|---|---|
| 1,706,218 | Chretien | Mar. 19, 1929 |
| 2,170,979 | Straubel | Aug. 29, 1939 |
| 2,282,869 | Johnson et al. | May 12, 1942 |

FOREIGN PATENTS

| Number | Country | Date |
|---|---|---|
| 3,058 | Great Britain | Feb. 9, 1903 |
| 265,288 | Italy | June 5, 1929 |

OTHER REFERENCES

Scientific American, August Number, 1939, pages 118 to 123 inclusive.

Journal Optical Society of America, May 1944, volume 34, No. 5, page 278.